United States Patent
Fang et al.

(10) Patent No.: US 10,078,647 B2
(45) Date of Patent: *Sep. 18, 2018

(54) ALLOCATING FREE SPACE IN A DATABASE

(71) Applicant: INTERNATIONAL BUSINESS MACHINES CORPORATION, Armonk, NY (US)

(72) Inventors: Min Fang, Beijing (CN); Di Jin, Beijing (CN); Zhenyu Shi, Beijing (CN); Nigel G. Slinger, Los Gatos, CA (US); Shu Wang, Beijing (CN); Li Fei Zheng, Shanghai (CN); Wen Jie Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/664,866

(22) Filed: Jul. 31, 2017

(65) Prior Publication Data
US 2017/0322957 A1    Nov. 9, 2017

Related U.S. Application Data

(63) Continuation of application No. 15/078,173, filed on Mar. 23, 2016.

(51) Int. Cl.
 *G06F 17/30* (2006.01)
(52) U.S. Cl.
 CPC .. *G06F 17/30303* (2013.01); *G06F 17/30117* (2013.01); *G06F 17/30289* (2013.01)

(58) Field of Classification Search
CPC combination set(s) only.
See application file for complete search history.

(56) References Cited

U.S. PATENT DOCUMENTS

| | | | |
|---|---|---|---|
| 6,108,653 | A | 8/2000 | Pereira |
| 2007/0168640 | A1* | 7/2007 | Hrle ................. G06F 17/30492 711/206 |
| 2008/0040406 | A1 | 2/2008 | Maxfield |
| 2011/0035359 | A1* | 2/2011 | Bendakovsky ..... G06F 11/1458 707/640 |
| 2012/0246132 | A1 | 9/2012 | Sebastian et al. |
| 2014/0095438 | A1 | 4/2014 | Marwah et al. |
| 2015/0100606 | A1 | 4/2015 | Bonner et al. |
| 2016/0294696 | A1 | 10/2016 | Gafni et al. |
| 2017/0277725 | A1 | 9/2017 | Fang et al. |

OTHER PUBLICATIONS

IBM, "List of IBM Patents or Patent Applications Treated as Related (Appendix P)," Feb. 28, 2018, p. 1-2.

* cited by examiner

*Primary Examiner* — Shyue Jiunn Hwa
(74) *Attorney, Agent, or Firm* — Robert C. Bunker (57) ABSTRACT

Allocating free space in a database table. Statistics associated with records in a database are received, including an average record byte size for records stored in the database table. A primary free space byte size for record updates is determined, including comparing a preliminary free space byte size to the average record byte size and a byte size of a record subjected to a database operation. Based on the primary free space byte size, free space at the page level of the database table is allocated.

1 Claim, 6 Drawing Sheets

ALLOCATING FREE SPACE IN A DATABASE

BACKGROUND

The present invention relates generally to a method, system and computer program product for database management, and more particularly for allocating free space in a database.

A relational database is a digital database whose organization is based on the relational model of data. This model organizes data into one or more tables, or relations, of rows and columns, with a unique key for each row. Rows in a database are also referred to as records. Generally, each entity type described in a database has its own table, the rows representing instances of that type of entity and the columns representing values attributed to that instance. Because each row in a table has its own unique key, rows in a table can be linked to rows in other tables by storing the unique key of the row to which it should be linked. Data relationships of arbitrary complexity can be represented using this set of concepts. The various software systems used to maintain relational databases are known as relational database management systems (RDBMS). Typically, relational database systems use SQL (Structured Query Language) as the language for querying and maintaining the database.

In a typical SQL database, the fundamental unit of data storage is the page, or block. The disk space allocated to a data file in a database is logically divided into pages numbered consecutively. Disk I/O operations are performed at the page level. That is, the database server reads or writes whole pages. Data pages include data rows of a table, typically put on the page serially, starting immediately after a header with control information.

A table space is a storage location where the actual data underlying database objects can be kept. It provides a layer of abstraction between physical and logical data, and serves to allocate storage for database objects, such as tables and indexes, that occupy physical space.

Databases usually have a clustering index (sometimes called a clustered index or index-organized table), which determines how rows are physically ordered, or clustered, in a table space. That is, for a table with a clustering index, the order of the rows in the data pages corresponds to the order of the rows in the index. Clustering indexes may provide significant performance advantages for some database operations, particularly those that involve a range of rows. When a table has a clustering index, an insert statement typically causes rows to be inserted as nearly as possible in the order of their index values. As a result, rows in a column are likely to be close together, such that the database server can generally access all the rows in a single read. However, using a clustering index does not guarantee that all rows for a given column value are stored on the same page. The actual storage of rows depends on the size of the rows, the number of rows, and the amount of available free, or reserve, space. Moreover, some pages may contain rows for more than one column value.

SUMMARY

Embodiments of the present invention disclose a computer-implemented method, computer program product, and system for allocating free space in a database table. Statistics associated with the database table may be received, including an average record byte size for records stored in the table. A primary free space byte size for record updates may be determined, including comparing a preliminary free space byte size to the average record byte size and a byte size of a record subjected to a database operation. Based on the primary free space byte size, free space at the page level of the table may be allocated.

BRIEF DESCRIPTION OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Data organization of table spaces and index spaces is a very important characteristic that affects the performance of a relational database management system (RDBMS). For example, if there is not sufficient free, or reserve, space reserved in the table space and/or the index space of a clustering index, the performance of numerous insert commands may be severely degraded if the RDBMS takes a long time to locate data pages or index pages for the newly inserted rows. On the other hand, too much free space may result in wasteful use of disk space and may also result in poor performance of applications which need to access consecutive rows of a table or an index. One goal of intelligent database organization is to increase the throughput of high-volume insert operations while utilizing disk space efficiently.

It is standard for an RDBMS to give users the option of specifying how free space is managed. In IBM® DB2® 11 for z/OS®, for example, the option FREEPAGE specifies how often to leave a page of free space when data is initially loaded into a table (with LOAD) or the table is reorganized (with REORG); for example, every tenth page. The option PCTFREE indicates what percentage of each page to leave as free space when data is loaded into a table or the table is reorganized. However, in practice, data rows are usually not inserted uniformly into a table or index. For example, suppose that a database for a banking application has an ACCOUNT table that is organized according to a clustering index with columns STATE, BRANCH, and ACCOUNT. Generally, a BRANCH entry may correspond to a large number of account entries, hence it may not make sense to leave free space among the data pages that hold the account rows, since newly inserted rows would likely be inserted after the existing account rows and before the account rows for the next branch. Free space left within the account rows is, therefore, superfluous. Moreover, the space after the account rows may not suffice to hold all newly inserted data. Furthermore, as different branches may experience different rates of increase for new account rows, reserving the same percentage of free space for all branches, for example via PCTFREE, may be far from optimal.

In the following, all trademarks and registered trademarks are the property of their respective owners.

Reserving free space in table spaces may enable data to remain clustered longer between reorganizations and can reduce the number of overflow rows and indirect references, which can harm performance. Unlike index pages, table space pages are not split. Free space is needed for inserts in clustering order and for updates where the size of the row has increased and there is not enough room on the page. For inserts, the row will generally go to another page. For updates, the row is generally moved to another page, but indexes still point to the original page, which in turn points to the new location. This is called an indirect reference.

Reorganizing tables and indexes restores physical continuity of table data and rebuilds indexes into unfragmented, physically contiguous pages. However, reorganizations are time consuming and a database table may be unavailable during reorganization. As a result, table/index reorganizations are often only performed, for example, weekly or monthly.

When insufficient free space is available for insert or update operations, new rows may be appended at the end of a table, out of clustering sequence. When updates to existing rows cause them to no longer fit on the original page, indirect references to one or more overflow rows on different data pages may be created, as illustrated below with reference to FIG. 2, as discussed below. When many of these rows are physically located out of sequence, performance suffers. On the other hand, specifying too much free space may also have disadvantages, including using more disk space for the same amount of data, transferring less data in a single I/O operation, and the data occupying more pages that must be scanned.

The creation of a table space in a database, such as a relational database, may include setting a parameter such as PCTFREE that specifies how much free space to reserve on data pages for various database operations related to loading and/or reorganizing data records. The reserved space may be used for inserting or updating data records, to accommodate increased data record sizes. However, an update that results in an increase in the size of a data record that exceeds the free space available on a data page, may cause the database management system to search for a new data page and generate an overflow record on the new data page.

Embodiments of the present invention disclose a computer-implemented method, computer program product, and system for allocating free space in a database table, for example, in a relational database. Record statistics associated with the database table may be received. The statistics may include an average record size, generally in bytes, for records stored in the database table. The term byte size refers to the size, or length, of a record or portion of a record, expressed in bytes. A primary free space byte size for records subject to a database operation, such as an insertion or a deletion, may be determined and, based on the primary free space byte size, free space at the page level of the database table may be allocated.

The methods, computer program products, and systems disclosed here may improve allocation of free space in a database table, compared to table-level free space allocation approaches, by allocating free space on a page-by-page basis, based on stored database record statistics and on the size of records subjected to various database operations, such as insertions or deletions. Traditional table-level solutions for reserving space in a database table, for example with PCTFREE, generally allocate space uniformly across all pages in table. In contrast, the methods, computer program products, and systems discussed here may improve allocation of free space by allocating space at a page level on a page-by-page basis or on an operation-by-operation basis (e.g., insertion of a record or deletion of a record).

In one embodiment, a preliminary amount of free space (e.g., for a particular data page) may be predefined, or a default value used, and it may be subsequently modified during a loading or reorganization process, based on the received database record statistics and the size of records subjected to a database operation. This may improve allocation of free space in a database table, for example, by efficiently increasing the amount of free space for updates to the database table records, which, in turn, may reduce the number of overflow records created. As mentioned, the creation of overflow records may be associated with various problems, such as extra I/O operations, because an RDBMS may need two I/O operations to get two separate database table pages (an original page and an overflow page) when the original record is accessed. Additional problems associated with overflow records may include extra locking (e.g., the RDBMS may lock both the original and overflow pages to ensure concurrency), extra space searching (e.g., when an overflow record is created, the RDBMS may perform extra space searching to find an available page for the overflow record), and extra logging.

The methods, computer products, and systems disclosed here may improve allocation of free space in a database table by determining free space for an updated or inserted record at the page level of the database table during load or reorganization operations, depending on the record (e.g., data rows, byte size) to be inserted into a given data page, and depending on record statistics associated with the database table. As mentioned, improved allocation of free space may reduce superfluous reserved free space in data pages and may improve database performance by decreasing I/O operations, reducing the buffer pool hit ratio, etc.

In one embodiment, determining the primary free space byte size further includes modifying the preliminary free space byte size based on the average record byte size and the byte size of the subject record. In various embodiments, the database operation is an insertion, and the preliminary free space byte size is increased, based on the difference in byte size between the average record byte size and the byte size of the subject record, where the byte size of the subject record is less than the average record byte size.

In other embodiments, the database operation is a deletion and the preliminary free space byte size is decreased, based on the difference in byte size between the average record byte size and the byte size of the subject record, where the byte size of the subject record is less than the average record byte size.

In one embodiment, determining the primary free space byte size is in response to commencing a database utility. In various embodiments, the utility is associated with a reorganization process or a page loading process.

In various embodiments, the database is a relational database, managed by a relational database management system (RDBMS).

Figure 1:
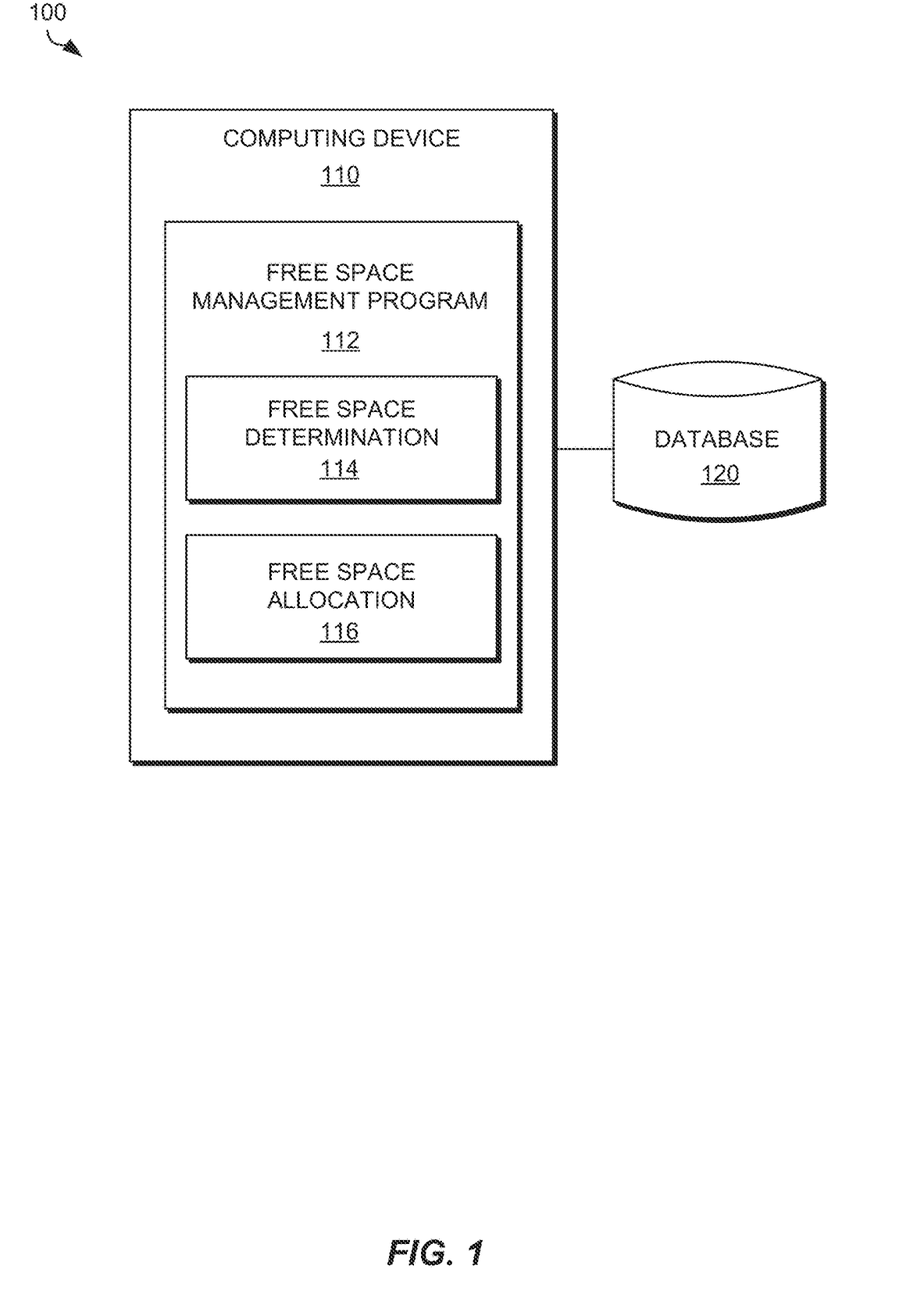
FIG. 1 depicts a functional block diagram of a free space management system, in accordance with an embodiment of the present invention.

FIG. 1 is a functional block diagram of a free space management system 100, in accordance with an embodiment of the present invention. Free space management system 100 includes computing device 110. Computing device 110 represents the computing environment or platform that hosts free space management program 112. In various embodiments, computing device 110 may be a laptop computer, netbook computer, personal computer (PC), a desktop computer, or any programmable electronic device capable of hosting free space management program 112, in accordance with embodiments of the invention. Computing device 110 may include internal and external hardware components, as depicted and described in further detail below with reference to FIG. 6.

In an exemplary embodiment of the invention, computing device 110 includes free space management program 112 and datastore 120.

Figure 6:
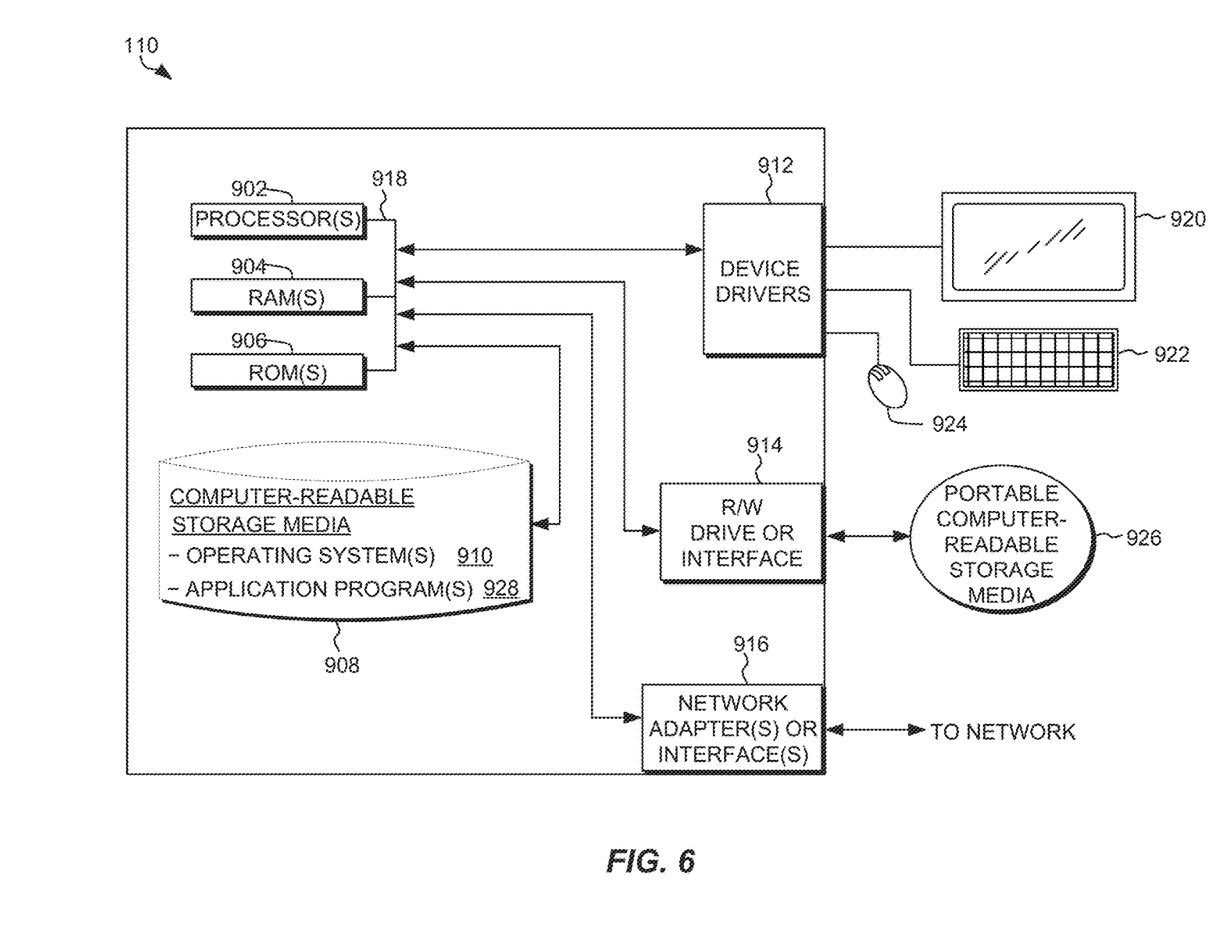
FIG. 6 is a functional block diagram illustrating a data processing environment, in accordance with an embodiment of the present invention.

Datastore 120 represents a store of data that may include one or more databases which may be managed by free space management program 112, in accordance with an embodiment of the present invention. Datastore 120 may also hold record statistics associated with one or more database tables, such as average size of records stored in a database table. For example, a program such as the DB2 utility RUNSTATS, system software that collects database statistics information, may be directed to collect statistics on records written to database tables, and periodically write the statistics to datastore 120. Alternatively, record statistics may be continually gathered and saved to datastore 120 by a real-time database statistics process. Datastore 120 may reside, for example, on computer readable storage media 908 (FIG. 6).

Free space management program 112, in an embodiment of the invention, operates generally to allocate free space in a database table at the page level. Free space management program 112 may include free space estimation module 114 and free space allocation module 116.

Free space estimation module 114 operates to estimate an amount of free space to allocate, in accordance with an embodiment of the present invention. Free space estimation module 114 receives record statistics for a database table from datastore 120. A subsequent REORG, LOAD, INSERT, or DELETE operation on a database table may cause free space estimation module 114 to use the record statistics for the database table to update an average record length for a data page of the database table and/or determine an appropriate amount of free space to reserve for data pages in the database table. An example is shown in Table 1.

Free space allocation module 116 operates to handle the actual allocation of free space in a database table, in accordance with an embodiment of the present invention. Upon a REORG, LOAD, INSERT operation on a database table, free space allocation module may invoke free space estimation module 114 to estimate an amount of free space to allocate for a data page of the database table. Free space allocation module 116 may receive a primary amount of free space to allocate for the data page and may adjust the primary amount, based on predefined maximum and minimum allowable amounts for the database table.

Table 1 presents an example illustrating estimating an amount of free space to reserve for a data page, and updating the average row length for the data page following an insert or delete operation, in accordance with an embodiment of the invention. It is assumed that before any further insert or delete operations there are a total of N records on the data page, with a total length of M bytes. Further, the current average row, or record, length is 50 bytes. Moreover, for the current page, a parameter BYTES_RESERVED_FOR_UPD_BY_PAGE specifies that the data page currently has 100 bytes of free space reserved. In Case 1, a row of length 40 bytes is inserted. The new value of the parameter BYTES_RESERVED_FOR_UPD_BY_PAGE becomes 100 bytes+(50 bytes−40 bytes)=110 bytes and the new average row length is calculated as (M+40)/(N+1). In Case 2, a row of length 60 bytes is inserted. The new value of the parameter BYTES_RESERVED_FOR_UPD_BY_PAGE does not change, but average row length becomes (M+60)/(N+1). In Case 3, a row of length 40 bytes is deleted. The new value of the parameter BYTES_RESERVED_FOR_UPD_BY_PAGE becomes 100 bytes−(50 bytes−40 bytes)=90 bytes and the new average row length is calculated as (M−40)/(N−1). In Case 4, a row of length 60 bytes is deleted. The new value of the parameter BYTES_RESERVED_FOR_UPD_BY_PAGE does not change, but the new average row length becomes (M−60)/(N−1). The two update operations shown as Cases 5 and 6 may be treated similarly to insert and delete.

TABLE 1

EXAMPLE CALCULATION OF FREE SPACE AND AVERAGE ROW LENGTH

| CASE | OPERATION | ROW LENGTH | NEW AVE ROW LENGTH | BYTES RESERVED FOR UPDATE |
|---|---|---|---|---|
| 1 | INSERT | 40 bytes | (M + 40)/(N + 1) | 110 |
| 2 | INSERT | 60 bytes | (M + 60)/(N + 1) | 100 |
| 3 | DELETE | 40 bytes | (M − 40)/(N − 1) | 90 |
| 4 | DELETE | 60 bytes | (M − 60)/(N − 1) | 100 |
| 5 | UPDATE | 50 bytes | (M − 10)/(N − 1) | 110 |
| 6 | UPDATE | 50 bytes | (M + 10)/(N + 1) | 100 |

In various embodiments of the invention, two table-level parameters, for example, PCTFREE_UPD_MIN and PCTFREE_UPD_MAX, may be defined. These parameters may respectively specify a minimum and maximum amount of free space that may be reserved for pages in a table. For example, the parameter BYTES_RESERVED_FOR_UPD_BY_PAGE may be adjusted relative to PCTFREE_UPD_MIN and PCTFREE_UPD_MAX after a calculation such as illustrated in Table 1.

Figure 2:
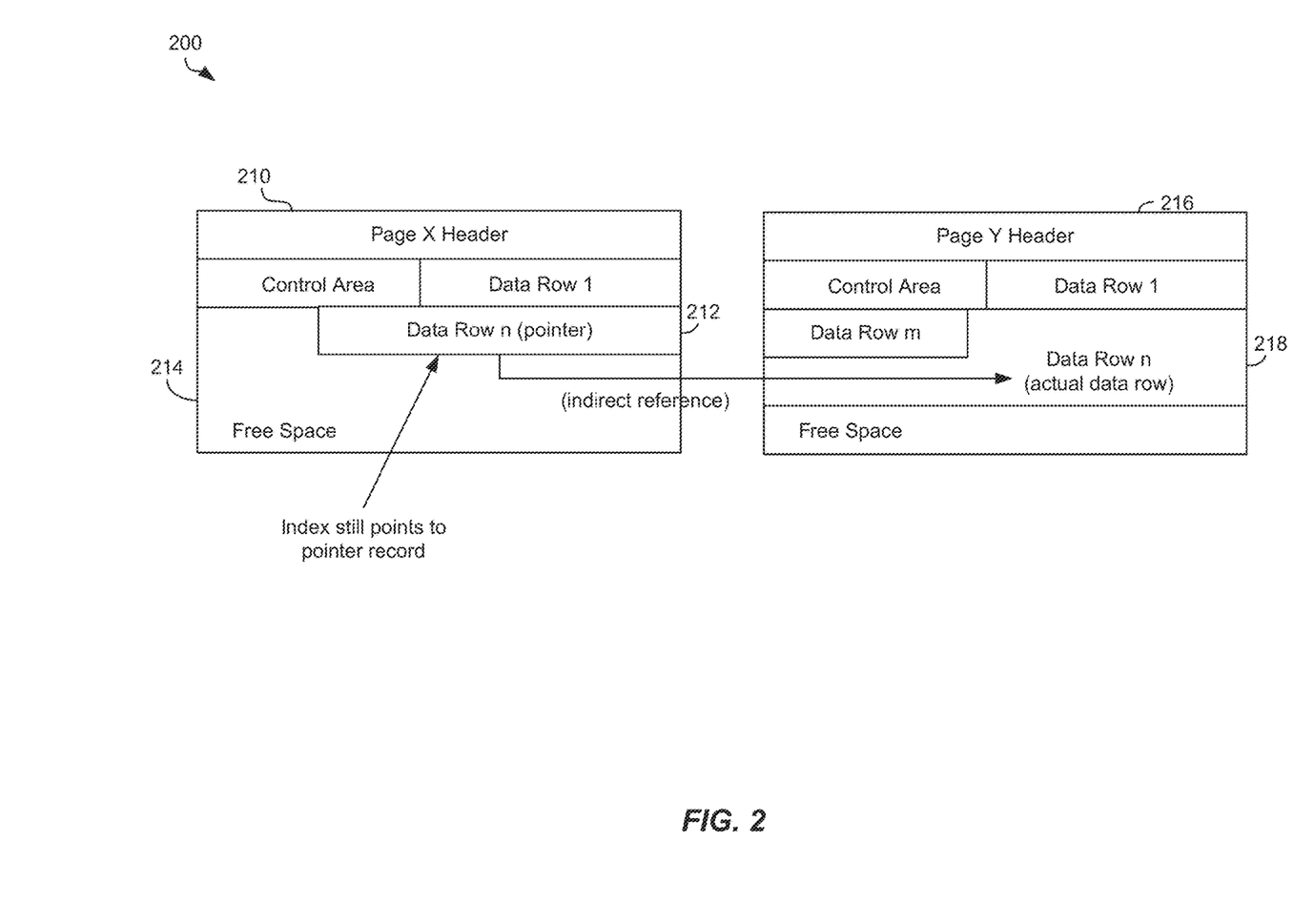
FIG. 2 is an example illustrating the creation of an overflow record in a database.

FIG. 2 presents an example illustrating the creation of an overflow record in a database table, as discussed above. Page X 210 represents a data page in a database table 200. Page X originally has a header, a control area, a number of data rows, such as data row 1 and data row n 212, and a certain amount of free space 214. If, due to an update, the free space reserved for data row n is not sufficient, data row n is written to another data page, such as Page Y 216, where there is sufficient space for a new row, an overflow record 218. In the process, data row n 212 is replaced by a pointer to the overflow record 218, which represents an indirect reference. As noted in FIG. 2, a database index that references Page X will still point to data row n 212 in Page X, at least until a subsequent reorganization.

Figure 3:
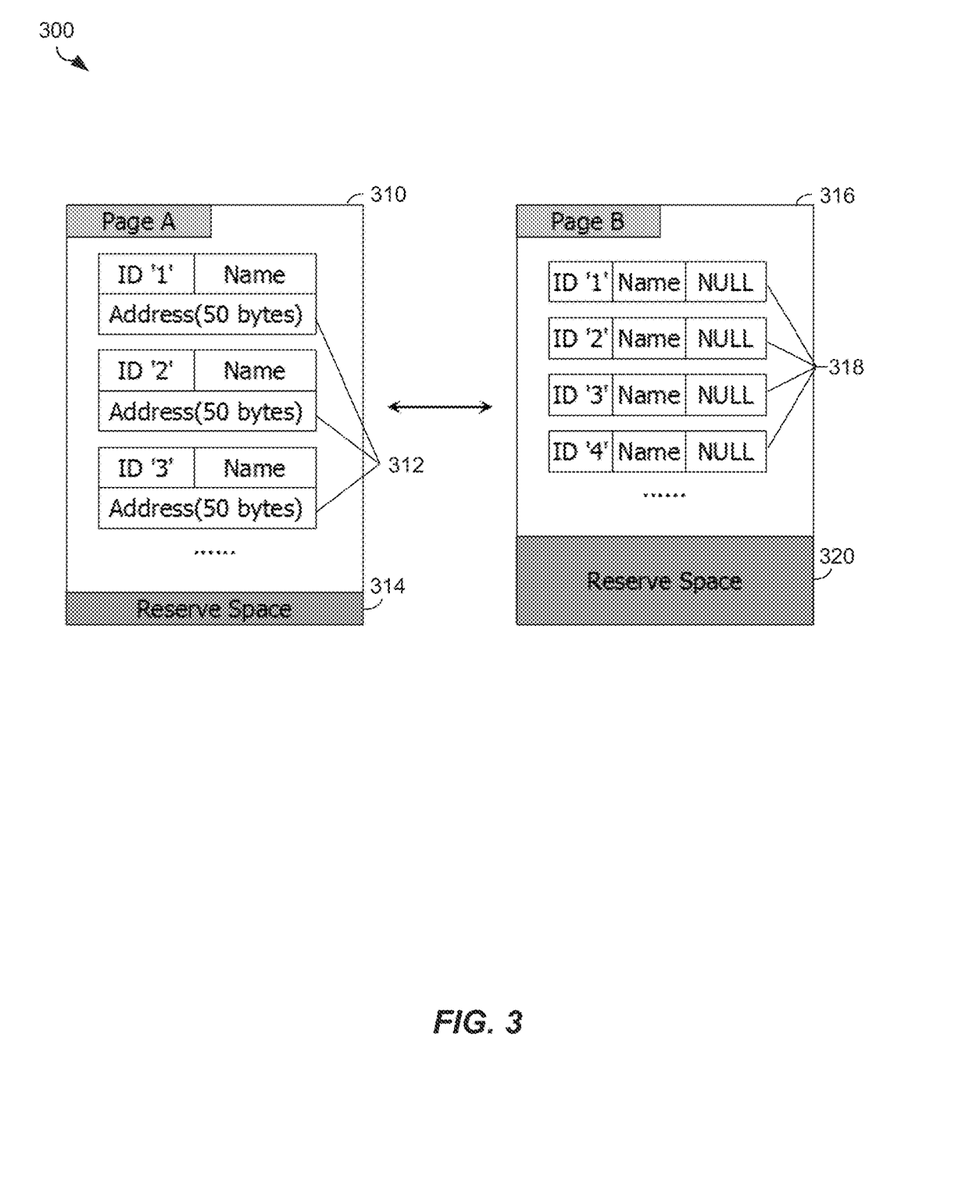
FIG. 3 is an example illustrating a disadvantage in proportionally allocating free space uniformly across pages.

FIG. 3 presents an example illustrating a disadvantage in proportionally allocating free space uniformly across pages, as discussed above. Page A 310 and Page B 316 represent data pages in a database table 300. Rows in table 300 include an ID, a name, and an address entry, assumed to be of variable length (e.g., VARCHAR). As shown, Page A has all records 312 with addresses of length 50 bytes, while all Page B records 318 are still NULL, or empty. Since updates to the address column on Page B are more likely, it would be advantageous for Page B to have a larger proportion of free space 320 than the amount of free space 314 needed for Page A.

Figure 4:
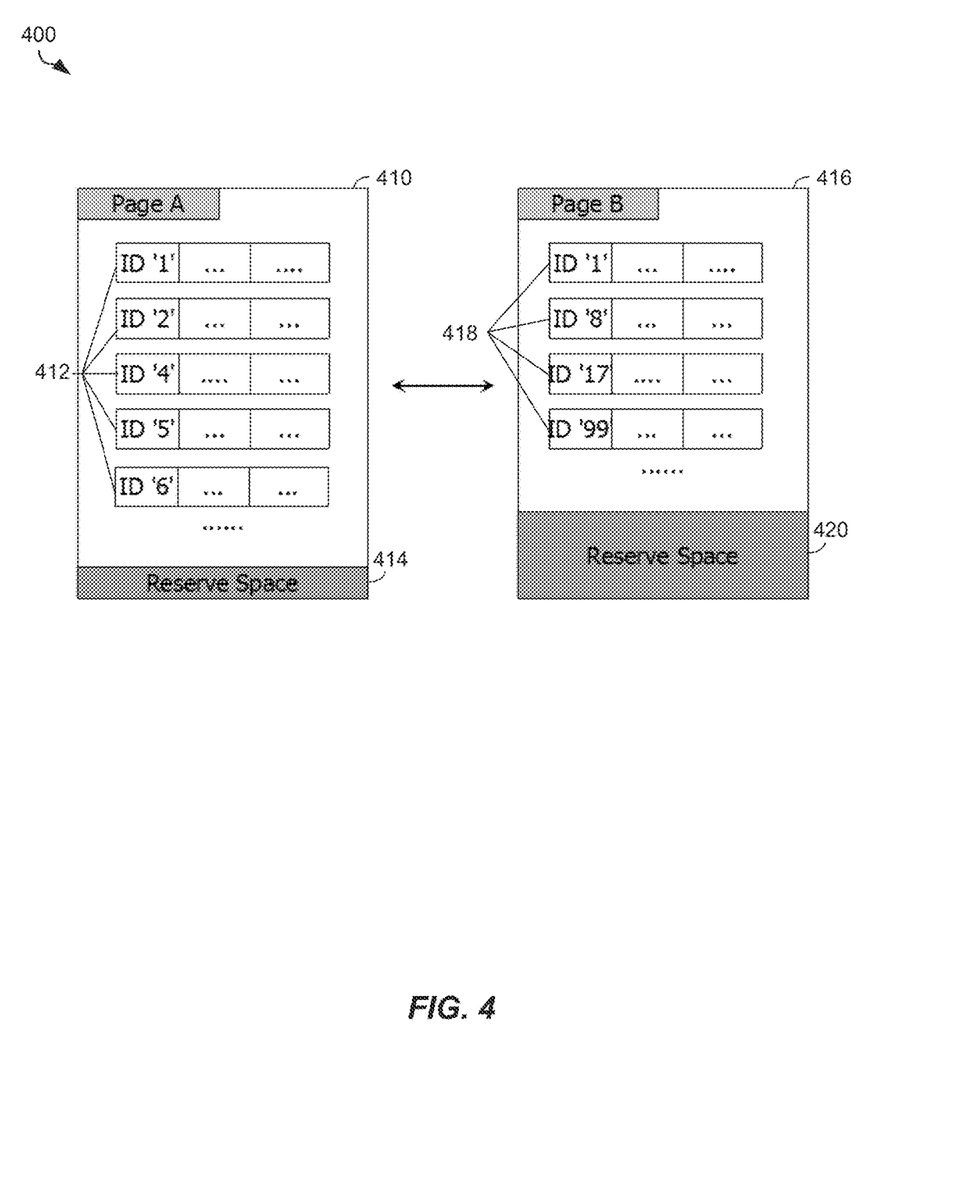
FIG. 4 is another example illustrating a disadvantage in proportionally allocating free space uniformly across pages.

FIG. 4 presents another example illustrating a disadvantage in proportionally allocating free space uniformly across pages. Page A 410 and Page B 416 represent data pages in a database table 400. Rows in table 400 include an ID, along with several other entries. It is assumed that table 400 has a clustering index with rows clustered according to the ID column. As shown, Page A has records 412 with sequential IDs, while Page B records 418 exhibit many gaps in the ID sequence. Since row inserts on Page B are more likely, it would be advantageous for Page B to have a larger proportion of free space 420 than the amount of free space 414 needed for Page A.

Figure 5:
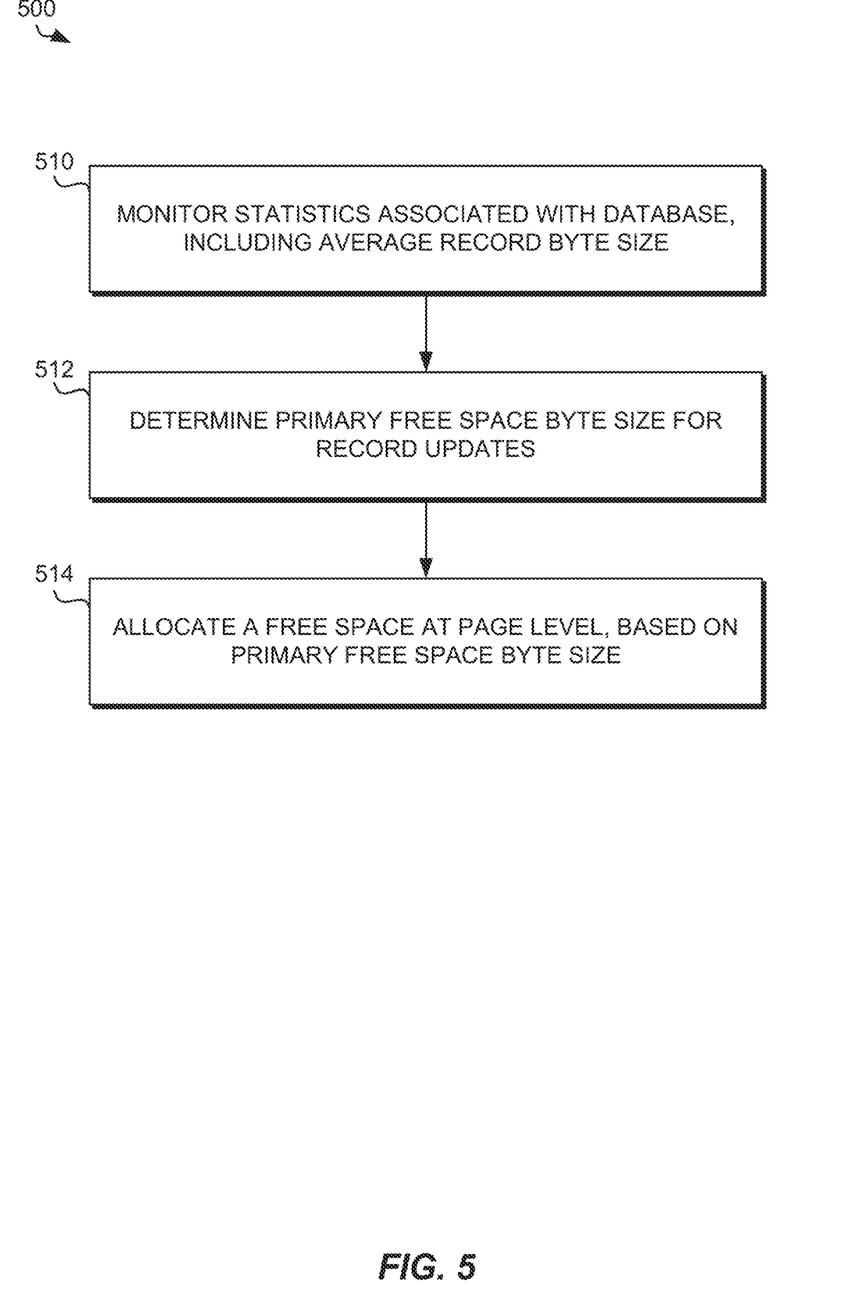
FIG. 5 is a flowchart depicting various steps of a method for allocating free space in a database, in accordance with an embodiment of the present invention.

FIG. 5 is a flowchart 500 depicting various operational steps performed by computing device 110 in executing free space management program 112, in accordance with an exemplary embodiment of the invention. Free space estimation module 114 receives statistics associated with records in a database table from datastore 120 (step 510). The record statistics may include an average record byte size for records stored in the database table. Based on the record statistics, free space estimation module 114 may determine a primary free space byte size for record updates, for example, by comparing a preliminary free space byte size to the average record byte size (e.g., from the received database table record statistics) and a byte size of a record subjected to a database operation such as insert or delete (step 512). Free space allocation module 116 may allocate free space at the page level of the database table, based on the primary free space byte size (step 514).

FIG. 6 depicts a block diagram of components of a computing device 110, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, free space management program 112, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user s. The device drivers 912, R/W drive or interface 914 and network adapter or interface 916 may comprise hardware and software (stored on computer readable storage media 908 and/or ROM 906).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for allocating free space in a database table associated with a relation database managed by a relational database management system, the method comprising:

receiving statistics associated with records in a database table, including an average record byte size for records stored in the database table;

receiving a database operation, wherein the received database operation comprises an insertion operation, a deletion operation, and an update operation;

determining a primary free space byte size for record updates based on the received database operation, wherein determining the primary free space byte size for record updates comprises comparing a preliminary free space byte size to the average record byte size and a byte size of a subject record, wherein determining the primary free space byte size further comprises modifying the preliminary free space byte size based on the average record byte size and the byte size of the subject record, wherein the subject record is subjected to the received database operation, wherein determining the primary free space byte size is in response to commencing a database utility, and wherein the database utility is associated with at least one of a reorganization process and a page loading process;

in response to determining that the received database operation is an insertion operation, increasing the preliminary free space byte size based on a first difference in byte size between the average record byte size and the byte size of the subject record, and wherein the byte size of the subject record is less than the average record byte size;

in response to determining that the received database operation is a deletion operation, decreasing the preliminary free space byte size based on a second difference in byte size between the average record byte size and the byte size of the subject record, and wherein the byte size of the subject record is less than the average record byte size;

in response to determining that the received database operation is an update operation that changes a record byte size, increasing or decreasing the preliminary free space byte size, based on the update increasing or decreasing the record byte size, respectively, based on a third difference in byte size between the average record byte size and the byte size of the subject record, and wherein the byte size of the subject record is less than the average record byte size; and allocating free space at a page level of the database table based on the primary free space byte size.

* * * * *